D. C. WATT & F. A. GREARSON.
DUST PROOF COVER FOR AUTOMOBILE TOPS.
APPLICATION FILED FEB. 20, 1915.
1,179,248.
Patented Apr. 11, 1916.
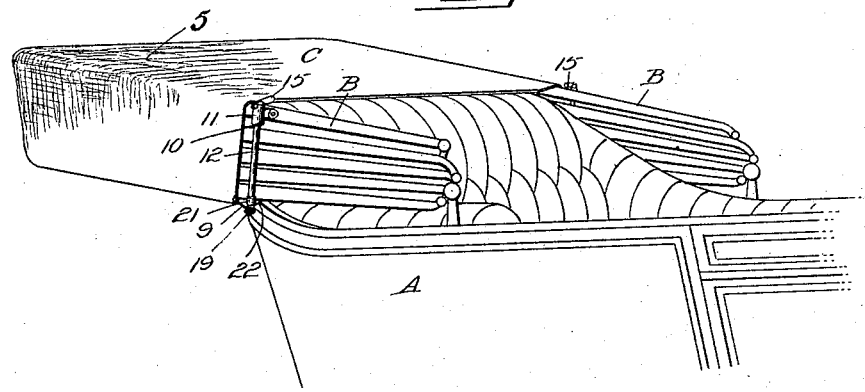
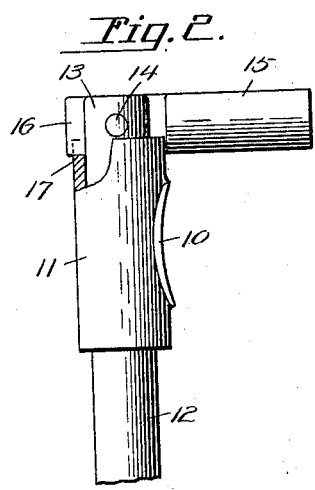
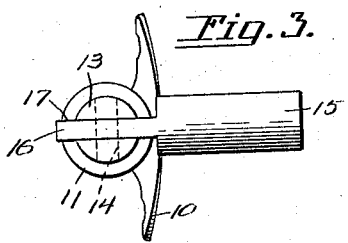
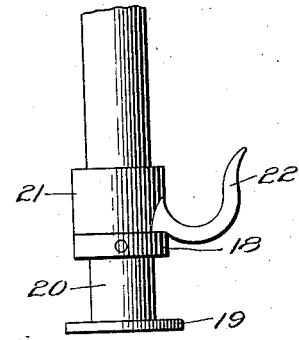
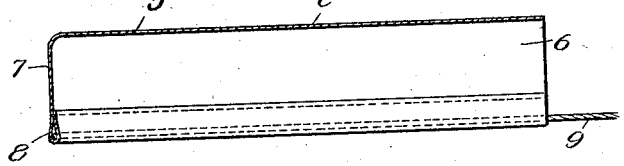
Witnesses
F. C. Gibson
Inventors
Delton C. Watt.
Frederick A. Grearson.
By Victor J. Evans
Attorney
THE COLUMBIA PLANOGRAPH CO., WASHINGTON, D. C.

UNITED STATES PATENT OFFICE.

DELTON C. WATT AND FREDERICK A. GREARSON, OF BARRE, VERMONT.

DUST-PROOF COVER FOR AUTOMOBILE-TOPS.

1,179,248.　　　　　　　Specification of Letters Patent.　　Patented Apr. 11, 1916.

Application filed February 20, 1915. Serial No. 9,710.

*To all whom it may concern:*

Be it known that we, DELTON C. WATT and FREDERICK A. GREARSON, citizens of the United States, residing at Barre, in the county of Washington and State of Vermont, have invented new and useful Improvements in Dust-Proof Covers for Automobile-Tops, of which the following is a specification.

The invention relates to dust proof covers or slips for foldable vehicle motor boat, or the like tops.

The primary object of the invention is the provision of a cover or slip which is especially useful for automobile foldable tops, wherein the necessity of a person getting out of the automobile for the application of the cover or slip, or its removal therefrom, is entirely obviated, as said cover or slip is designed to permit the quick and easy placing of the same upon the top, when folded, of an automobile, as well as its removal, without requiring the occupant or driver of the car leaving the same or stepping therefrom on to the ground for this purpose.

Another object of the invention is the provision of a cover or slip of this character wherein the same can be held drawn about the foldable top of an automobile so as to protect the same from dust or during inclement weather, and also to assure a neat and tidy appearance when the top is not in use.

A still further object of the invention is the provision of a cover or slip of this character which is novel in form and is readily and easily adjustable to snugly fit the foldable top when not in use, and to prevent the bulging of such cover or slip resultant from wind current while the automobile is in motion.

A still further object of the invention is the provision of a cover or slip of this character which is simple in construction, reliable and efficient in operation, strong, durable, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawing: Figure 1 is a fragmentary perspective view of a portion of an automobile showing the top folded with the cover or slip constructed in accordance with the invention applied. Fig. 2 is an enlarged side elevation of one of the securing pins or stems fitted in its socket, the latter being partly broken away. Fig. 3 is a top plan view thereof with the pin fastened. Fig. 4 is a vertical longitudinal sectional view through the cover or slip, showing the draw string or cord therein.

Similar reference characters indicate corresponding parts throughout the several views in the drawing.

Referring to the drawing in detail, A designates a portion of the body of an automobile, and B the bows of the foldable top therefor, which is of the ordinary well-known construction, and in this instance is folded to illustrate the application of the dust-proof cover or slip hereinafter fully described.

The dust-proof cover or slip comprises a flexible body C, preferably made from water-proof fabric material, although it may be made from any other suitable material, and is designed to cover the top when folded at the top portion, sides, and rear end, as is clearly shown in Fig. 1 of the drawing. In other words, the body C is formed with the top section 5, sides 6, and end 7. The free edge of the sides 6 and end 7 of the body C is folded inwardly and upwardly on itself and stitched to provide a casement 8 for receiving a drawstring or cord 9 so that the cover or slip can fit snugly about the foldable top on the drawing of the string 9 in a manner presently described.

Fixed to the foremost bow B of the series constituting the supports for the foldable top on each limb thereof is a socket member comprising a base 10 which is fastened in any suitable manner to the said limb, and a sleeve 11 integral with said base, the sleeve being designed to form the socket for receiving a pin or stem 12 which is provided with a bifurcated upper end 13 in which is pivoted at 14 a swinging handle 15, the reduced pivoted end 16 of which is adapted when swung at right angles to the pin or stem 12 to engage in diametrically opposed notches 17 formed in the upper end of the sleeve 11 for the locking of the pin or stem 12 against rotation after it has been inserted in the socket member, as shown in Figs. 1 and 2 of the drawing.

To each of the pins or stems 12 is fastened one end of the cord or string 9, the said pin or stem 12 being fitted with a collar 18 and a terminal head 19 spaced therefrom to provide a winding and unwinding reel portion 20 therebetween for the cord or string 9, as will be clearly apparent. Surrounding the pin or stem 12 is the sleeve-like portion 21 of a hook 22 which is adapted to engage the rim or bow of the series for the top B, when the pin or stem 12 is inserted in the socket member for the clamping of the bows together when the top is folded and the handle 15 has been swung to locking position, as shown in Fig. 2 of the drawing. This hook 22 will also prevent any displacement of the pin or stem 12 when the cover or slip has been applied to the top when folded as shown in Fig. 1 of the drawing.

When it is desired to apply the cover or slip after the top of the automobile has been folded the same is thrown over the said folded top into the position as shown in Fig. 1, and thereafter the handle 15 is swung into alinement with the pin or stem 12, whence it is inserted through the sleeve 11 of the socket member to bring the hook 22 into engagement with the lowermost or rearmost bow of the folded top, whereupon the handle 15 is slightly tilted so that the pin or stem 12 can be rotated for drawing upon the cord 9, which will wind upon the portion 20 of the said pin or stem, thereby tightening the cover or slip upon the folded top, and finally the handle 15 is lowered to bring the reduced end 16 into engagement with the notches 17 for the locking of the pin or stem 12 against rotation, and this completes the application of the slip or cover to the folded top. The manner of removing the cover or slip from the folded top of the automobile will be clearly obvious, and therefore an extended explanation relative thereto has been omitted.

What is claimed is:—

1. A cover or slip for folded vehicle tops comprising a substantially scoop-shaped flexible body, means extending about the sides and one end of the body for drawing upon the same, socket members fixed to one of the bows of the top, and means insertible for rotation in the socket members and engaged with the said first-named means for the drawing of the sides and one end to snugly fit the body upon the folded top.

2. A cover or slip for folded vehicle tops comprising a substantially scoop-shaped flexible body, means extending about the sides and one end of the body for drawing upon the same, socket members fixed to one of the bows of the top, means insertible for rotation in the socket members and engaged with the said first-named means for the drawing of the sides and one end to snugly fit the body upon the folded top, means on the last-named means for respective locking engagement with the socket member and clamping engagement with another of the bows of the folded top to hold the body fixed relative to the top, and means for preventing the turning of the rotatable means.

In testimony whereof we affix our signatures in presence of two witnesses.

DELTON C. WATT.
FREDERICK A. GREARSON.

Witnesses:
  EARLE R. DORIS,
  JOS. F. CONWAY.

Copies of this patent may be obtained for five cents each, by addressing the "Commissioner of Patents, Washington, D. C."